(12) United States Patent
Barnholt et al.

(10) Patent No.: US 6,609,649 B1
(45) Date of Patent: Aug. 26, 2003

(54) METHOD FOR MANUFACTURING BANJO-TYPE AXLE HOUSINGS

(75) Inventors: Mark Charles Barnholt, Fort Wayne, IN (US); James A. Krisher, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/903,679

(22) Filed: Jul. 13, 2001

(51) Int. Cl.[7] .......................... B23K 31/10; B21D 53/90
(52) U.S. Cl. .................. 228/171; 228/173.4; 29/897.2; 29/557
(58) Field of Search .................. 228/170, 171, 228/159, 160, 161, 164, 173.4; 74/607; 29/897, 897.2, 428, 463, 445, 557, 558

(56) References Cited

U.S. PATENT DOCUMENTS

| | | |
|---|---|---|
| 1,887,494 A | 11/1932 | Murray, Jr. |
| 1,970,231 A | 8/1934 | Habicht |
| 2,069,480 A | 2/1937 | Riemenschneider et al. |
| 2,674,783 A | 4/1954 | Schneider et al. |
| 3,015,238 A | 1/1962 | Williams |
| 3,673,888 A * | 7/1972 | Moll et al. .................... 74/607 |
| 3,793,703 A * | 2/1974 | Winkler et al. ............... 29/463 |
| 4,760,755 A | 8/1988 | Peck |
| 4,921,159 A | 5/1990 | Peck |

* cited by examiner

Primary Examiner—M. Alexandra Elve
Assistant Examiner—Kevin L McHenry
(74) Attorney, Agent, or Firm—Liniak, Berenato & White (57) ABSTRACT

A method for manufacturing a banjo-type drive axle housing for a motor vehicle is disclosed. The first step is the operation of forming the substantially identical upper and lower half members having a U-shaped cross-section along entire length thereof with radially extending wall sections. Each of the members is metal formed, such as by stamping or forging, from a blank sheet of steel. Next step is to select a desired box-section of an axle beam portions, and a desired size of an opening in a central portion of the axle housing. Then, if necessary, the wall sections of the housing half members are trimmed so that when assembled said housing half members provide the desired box section and size of the opening in the central portion of the axle housing. Finally, the trimmed housing half members are welded to each other to produce the axle housing.

7 Claims, 7 Drawing Sheets

Fig. 18

METHOD FOR MANUFACTURING BANJO-TYPE AXLE HOUSINGS

BACKGROUND OF THE INVENTION

1. Field of the Invention

This invention pertains in general to vehicle axle assemblies and, more particularly, to an improved method for manufacturing a banjo-type axle housing for such an axle assembly.

2. Description of the Prior Art

Axle assemblies are well known structures that are in common use in most vehicles. Such axle assemblies include a number of components, which are adapted to transmit rotational power from an engine of the vehicle to the wheels thereof. Typically, an axle assembly includes a differential assembly that is rotatably supported within a non-rotating carrier. The differential is connected between an input drive shaft extending from the vehicle engine and a pair of output axle shafts extending to the vehicle wheels. The axle shafts are contained in respective non-rotating beam portions, which are secured to the carrier. Thus, rotation of the differential by the drive shaft causes corresponding rotation of the axle shafts. The carrier and the beam portions form an axle housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the differential assembly) is directly connected to the two beam portions (which house the rotatable axle shafts). An opening is provided at the rear of the carrier to permit assembly of the differential therein. A cover closes this opening during use. Unitized carrier axle housing constructions of this type are economical to manufacture and are readily adaptable for a variety of vehicles.

The second axle housing type is a separable carrier construction. In this structure, the axle beam portions are connected together by a central portion of the axle housing that is formed separate and apart from the differential carrier. This central portion is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central portion and the elongated beam portions extending therefrom) generally resembles the shape of a banjo musical instrument. Hence, this type of axle housing is commonly referred to as a banjo type axle housing. Banjo type axle housings are advantageous because the carrier and differential can be removed from the axle assembly for service without disturbing the other components thereof.

In the past, several methods have been employed to form banjo type axle housings. A first known method involved forming the hollow cylindrical central member and the two beam portions as three separate pieces. The beam portions were then secured to the central member by welding or other means to form the housing. A second known method involved forming the entire housing from a single tubular blank. A hole was cut through the center of the blank, then formed into the hollow cylindrical central member, while the opposed end portions of the blank extended outwardly therefrom to form the beams. A third known method involved forming the central member integrally from the ends of the two beams. This was accomplished by splitting one end of each of the two beam portions, spreading the two split ends apart, and securing the two spread ends together to form the hollow cylindrical central member.

A fourth and one of the most common methods for manufacturing the banjo type axle housings involves forming two opposite halves of the axle housing by stamping or forging from a pre-cut blank of sheet steel. Next, the two axle housing halves are then welded along mated horizontal edges, and then the axle assembly is completed in a known manner. The described method is well known in the art and disclosed in a number of U.S. Patents, e.g. U.S. Pat. Nos. 4,921,159 and 2,674,783, incorporated herein by reference.

The above fourth method for manufacturing the banjo type axle housings is relatively simple and efficient. However, tooling used for stamping the axle housing halves is very expensive. Moreover, when a number of axle housings of various sizes are produced, a corresponding number of different metal forming apparatuses has to be employed that requires rather large tooling expenses.

While the above-described known methods have been used successfully to form banjo type axle housings, it has been found that all require large tooling expenses, especially when a number of different axle housing designs is produced by the same manufacturer.

Therefore, it would be desirable to provide an improved method for forming a banjo type axle housing which employs a common metal forming apparatus and a single size of the metal stamping for producing different axle housing designs, thus considerably reducing cost of manufacture.

SUMMARY OF THE INVENTION

It is an object of the present invention to provide an improved method for manufacturing a banjo-type drive axle housing for a motor vehicle, including an enlarged central portion defining a hollow interior adapted for housing a differential assembly therein, and a pair of sleeve-like axle beam portions outwardly laterally extending from opposite sides of the center portion for housing axle shafts. The central portion has a front carrier opening and a rear opening formed theretrough. The axle beam portions of the axle housing of the present invention are generally rectangular in cross-section to withstand torsional and vertical loading strains and stresses. The rectangular cross-section of the axle beam portion is known in the art as a box-section, and is characterized by a height of the box-section and its width.

The present invention is directed to a method for manufacturing of a range of banjo-type axle housings of selective box-sections of the axle beam portions and size of the openings in the central portion thereof.

The method, according to the present invention, is performed in the following manner.

First step is the operation of forming the substantially identical upper and lower channel-shaped half members, such as by stamping or forging, from a blank metal sheet. Each of the housing half members has a substantially U-shaped cross-section along entire length thereof with radially extending sidewalls.

Next step is to select a desired box-section of the axle beam portions of the axle housing corresponding to a required axle housing vertical load rating, and a desired size of the openings in the central portion of the axle housing corresponding to a required axle housing torque rating.

Then, if necessary, proper portions of the sidewalls of the axle beam half portions of both the upper and lower housing half members are trimmed so as to provide the desired box-section of the axle beam portions of the axle housing when assembled. Also, if necessary, proper portions of the sidewalls of the banjo half portion of both the upper and lower housing half members are trimmed so as to provide the desired size of the openings in the central portion of the axle housing when assembled.

Finally, the trimmed matched upper and lower housing half members are secured to each other, preferably by welding along mating horizontal edges, thus providing the desired box-section of the axle beam portions and the openings in the central portion 12 of the axle housing.

Therefore, the present invention allows to manufacture banjo type axle housings having selective height of the box-section of the axle beam portions, and selective size of the carrier opening and/or the rear opening of the central portion determined by the specific requirements of vehicle manufacturers, using a common metal forming apparatus and a single size of the metal stamping. Thus, the method for manufacturing a banjo-type drive axle housing according to the present invention, allows significantly reduced tooling expenses and provides a substantially more flexible manufacturing process.

DESCRIPTION OF THE PREFERRED EMBODIMENT

The preferred embodiment of the present invention will now be described with the reference to accompanying drawing.

Figure 1:
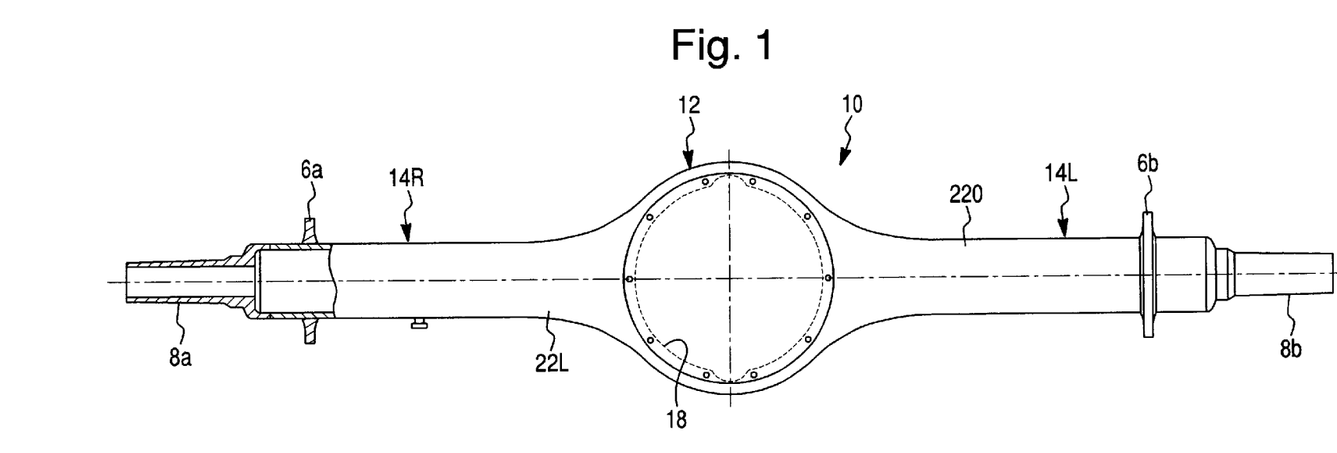
FIG. 1 is rear view, partly in section, of a banjo type drive axle housing.
Figure 2:
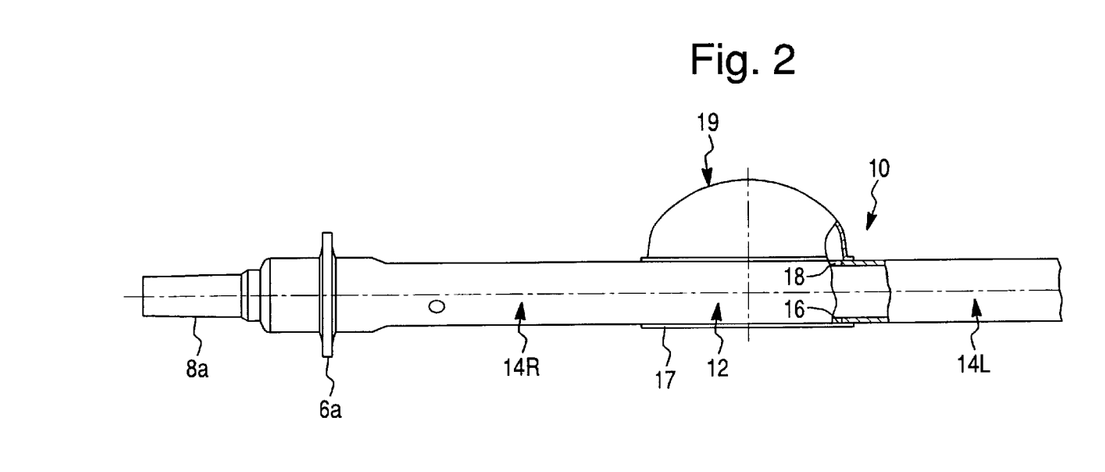
FIG. 2 is a top view, partly in section, of the banjo type drive axle housing.

Referring to FIGS. 1 and 2 of the drawings, an exemplary embodiment of a typical banjo-type axle housing, generally denoted by reference numeral 10, for use in a conventional automotive vehicle, is illustrated. The banjo-type axle housing 10 comprises an enlarged central, or banjo, portion 12 defining a hollow interior adapted for housing a differential assembly (not shown) therein, and a pair of sleeve-like axle beam (or tube) portions 14R and 14L outwardly laterally extending from opposite sides of the center portion 12 for housing axle shafts (not shown). The central portion 12 has a front carrier opening 16 formed therethrough on its forwardly facing side, and a rear opening 18 formed therethrough on its rearwardly facing side. A carrier attachment flange 17 is secured at the front carrier opening 16. A closure bowl 19 is fastened at the rear opening 18, typically by welding. An outboard end of each of the axle beam portions 14R and 14L is provided with a brake support flange (6a and 6b) and an axle spindle member (8a and 8b) attached thereto typically by welding.

Figure 3:
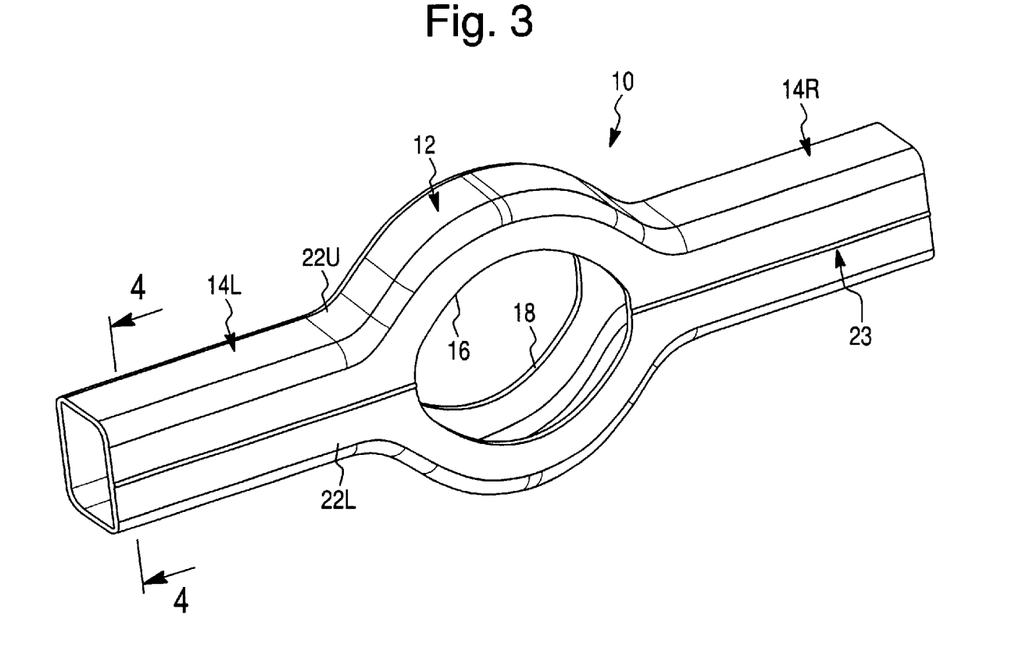
FIG. 3 is a perspective view of the banjo type drive axle housing.
Figure 4:
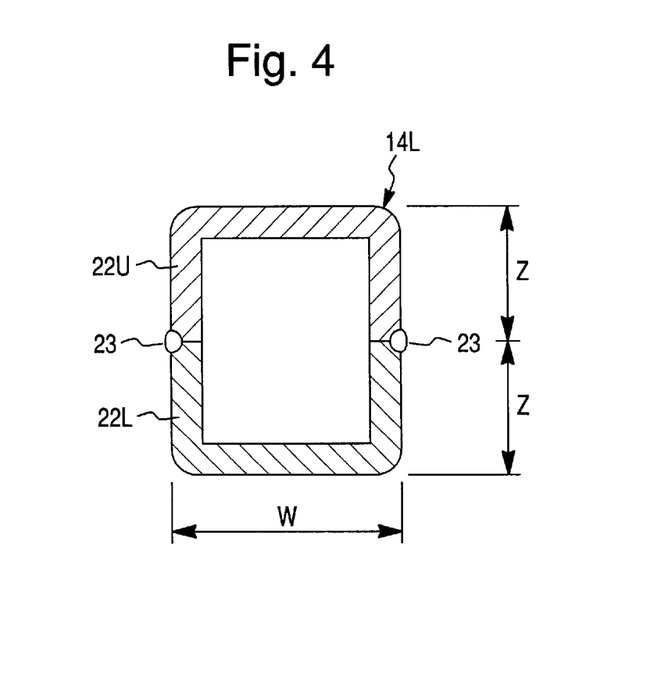
FIG. 4 is a cross-sectional view of an axle beam portion of the banjo type axle housing, taken along the plane 4—4 of FIG. 3.

Referring now to FIG. 3 illustrating the preferred embodiment of the axle housing 10 manufactured in accordance with the present invention, the axle housing 10 comprises an upper half member 22U and a lower half member 22L with their abutting adjacent side wall edges welded together along a straight substantially horizontal region 23. The axle beam portions 14R and 14L of the axle housing 10 of the present invention are generally rectangular in cross-section. As illustrated in FIG. 4, the rectangular cross-section of the axle beam portion, known as a box-section in the art, is characterized by dimensions 2Z (a height of the box-section) and W (a width of the box-section). The box-section of the axle beam portions 14R and 14L needs to be selected to withstand torsional and vertical load to the axle housing 10, and load fluctuations.

Figure 5:
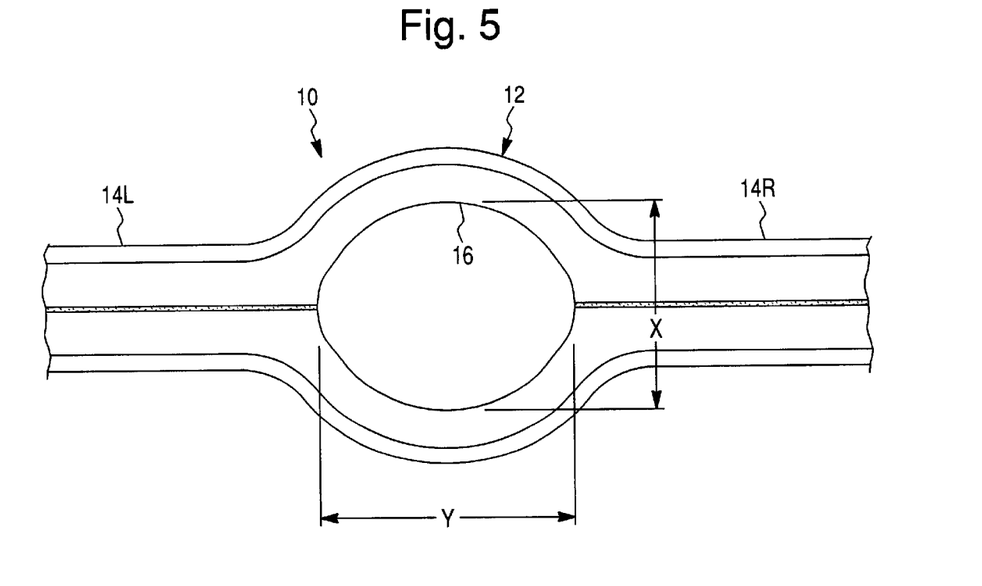
FIG. 5 is a front view of the banjo type drive axle housing showing a carrier opening.

As illustrated in FIG. 5, the front opening 16 in the central portion 12 is characterized by dimensions X (a height of the opening 16) and Y (width of the opening 16). It will be appreciated that the rear opening 18 is similarly characterized by dimensions X (a height of the opening 18) and Y (a width of the opening 18).

It is well known in the art that automotive drive axles are sized in two basic ways: 1) a vertical load rating of the axle housing, and 2) a torque rating of the axle. The vertical load rating of the axle housing depends largely on a bending strength of the axle housing. In turn, the bending strength of the axle housing substantially depends on the height of its box-section, i.e. the bending strength of the axle housing greatly improves as the box-section height increases. In turn, the torque rating of the axle depends largely on a size of a ring gear of the differential assembly. Thus, the dimensions of the front opening 16 (X and Y) in the central portion 12 has to be large enough to receive the ring gear that provides a required torque rating of the axle.

Both the upper and a lower half members 22U and 22L are substantially similar, and while the description set forth hereinafter, unless otherwise specified, relates to only the upper half member 22U of the axle housing, it is to be understood that the lower half member 22L may be similarly described, being constructed identically with the upper half member 22U.

Figure 6:
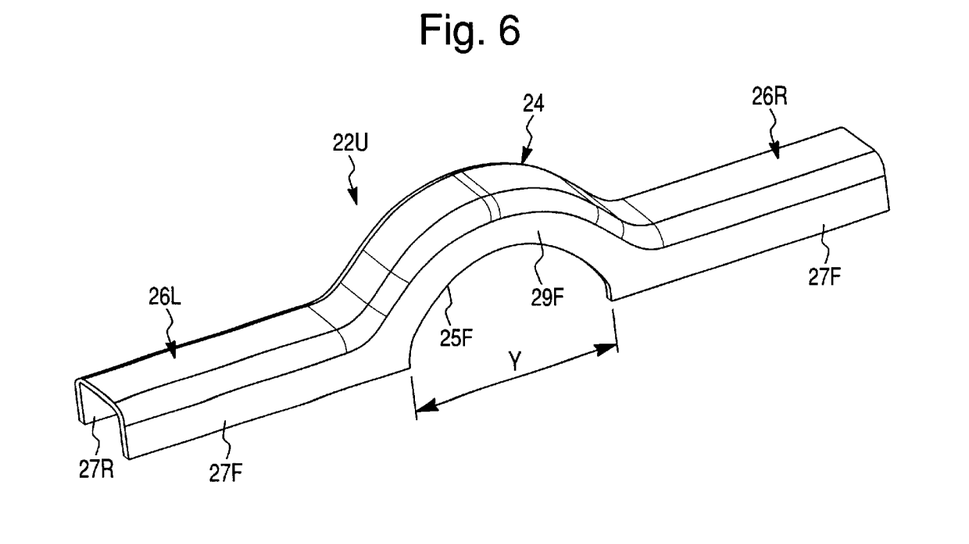
FIG. 6 is a perspective view of an upper half member of the banjo type drive axle housing.
Figure 7:
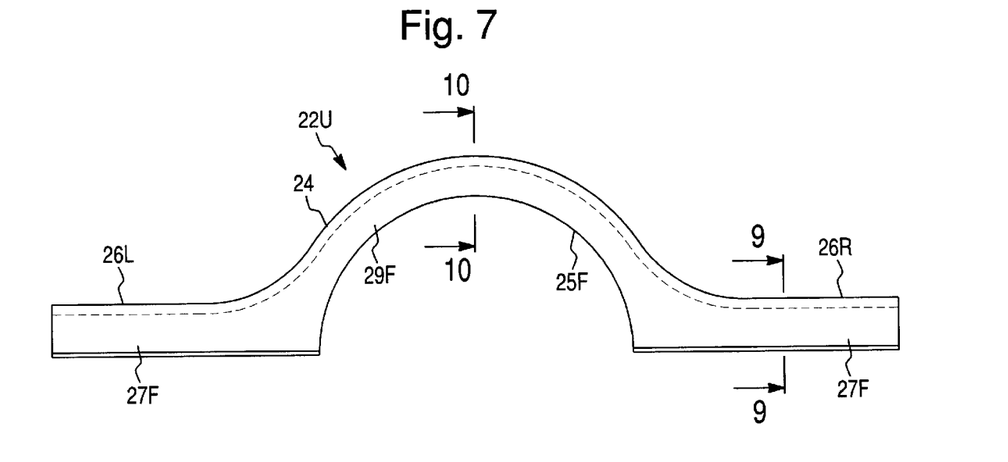
FIG. 7 is a front view of the upper half member of FIG. 6.
Figure 8:
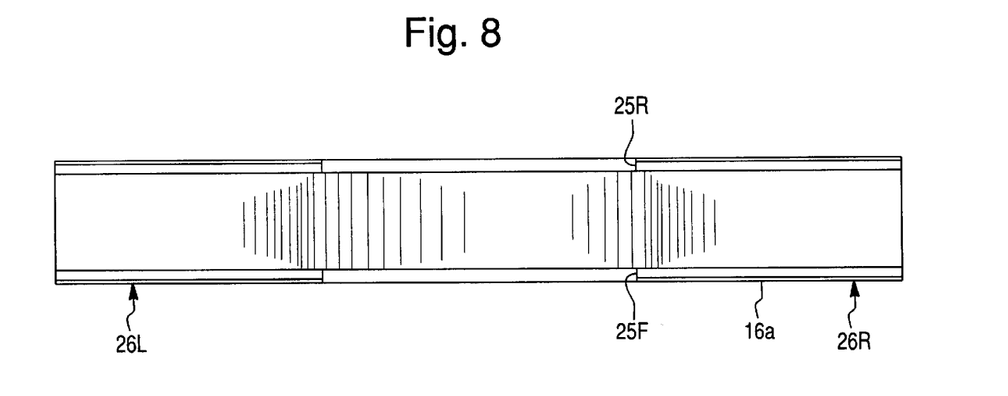
FIG. 8 is a view from below of the upper half member of FIG. 6.

The exemplary embodiment of the upper half member 22U, as illustrated in detail in FIGS. 6–8, is channel-shaped in cross-section along its entire length. This channel is in the form of a U-shaped cross-section having rounded corners and is substantially rectangular. The upper half member 22U comprises a banjo half portion 24 and opposite axle beam half portions 26R and 26L outwardly laterally extending from opposite sides of the banjo half portion 24. Each of the axle beam half portions 26R and 26L is provided with a front wall section 27F and a rear wall section 27R. Correspondingly, the banjo half portion 24 is provided with a front wall section 29F defining a front opening 25F in the banjo half portion 24, and a rear wall section 29R defining a rear opening 25R in the banjo half portion 24.

Figure 9:
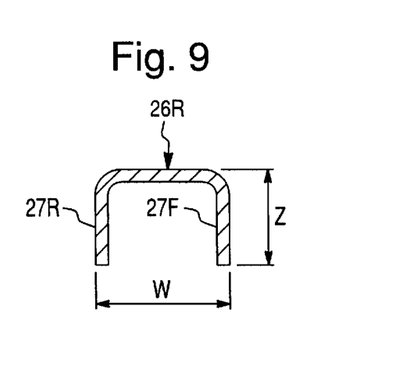
FIG. 9 is a cross-sectional view of an axle beam half portion of the upper half member of the banjo type axle housing, taken along the plane 9—9 of FIG. 7.
Figure 10:
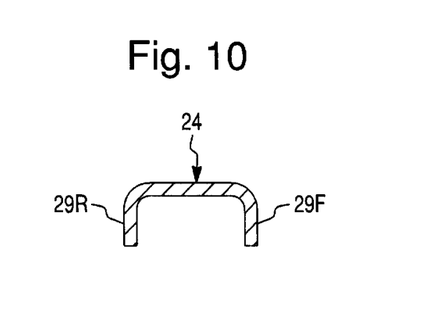
FIG. 10 is a cross-sectional view of a banjo half portion of the upper half member of the banjo type axle housing, taken along the plane 10—10 of FIG. 7.

As illustrated in FIG. 9, the U-shaped cross-section of the axle beam half portions 26R and 26L is characterized by dimensions Z (a height of the wall sections 27F, 27R) and W (width of the channel). Inn turn, the front opening 25F in the banjo half portion 24 is characterized by dimensions ½× (a height of the opening 25F) and Y (width of the opening 25F), as shown in FIG. 6.

Preferably, the upper and a lower half members 22U and 22L are substantially identical. However, non-identical upper and a lower half members are also within the scope of the present invention.

The present invention is directed to a method for manufacturing a range of banjo-type axle housings of selective vertical load ratings and torque ratings, i.e. manufacturing the banjo-type axle housings with selective box-sections of the axle beam portions and size of the openings in the central portion thereof.

With this embodiment, the method of assembly is performed in the following manner.

Figure 11:
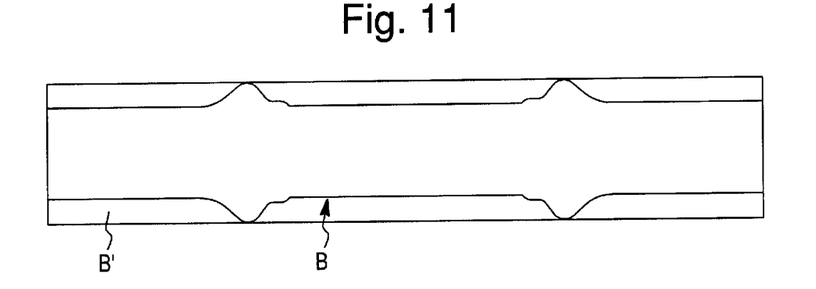
FIG. 11 is a top plan view of a pre-cut blank of a sheet metal from which the axle housing half member is fabricated in accordance with the present invention.
Figure 13:
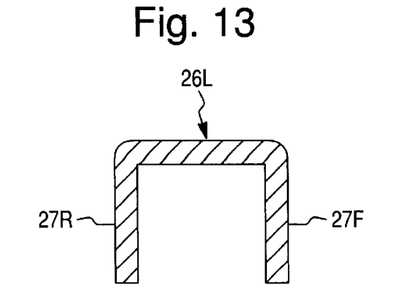
FIG. 13 is a cross-sectional view of the axle beam half portion of the upper half member of the banjo type axle housing, taken along the plane 13—13 of FIG. 12.
Figure 14:
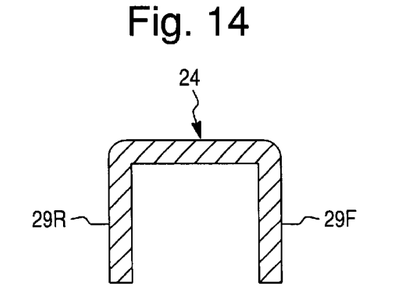
FIG. 14 is a cross-sectional view of the banjo half portion of the upper half member of the banjo type axle housing, taken along the plane 14—14 of FIG. 12.

First step is the operation of forming the substantially identical upper and a lower channel-shaped half members 22U and 22L. Similarly to the conventional method for manufacturing of banjo-type axle housings described hereinabove, each-of the members 22U and 22L is formed, such as by stamping or forging, from a blank sheet B. The blank sheet B, shown in FIG. 11, is normally cut out of a larger sheet of metal B', preferably steel, by any appropriate method known in the art, such as by a single punching operation. The operation of forming axle housing half member from a blank sheet of steel is well known to those skilled in the art and is taught e.g. by U.S. Pat. Nos. 4,921,159 and 2,674,783, both of which are herein incorporated by reference. Each of the upper and lower half members 22U and 22L of the axle housing fabricated during the first step of the novel method, has a height Z of the wall sections 27F, 27R corresponding to the largest box-section of the axle beam portions of the axle housing, and the height ½× and the width Y of the front opening 25F in the banjo half portion 24 of the axle housing corresponding to the smallest size of the opening 25F, as illustrated in FIGS. 12–14.

Next step is to select a desired box-section of the axle beam portions of the axle housing corresponding to a required axle housing vertical load rating, and a desired size of the openings in the central portion of the axle housing corresponding to a required axle housing torque rating.

Figure 12:
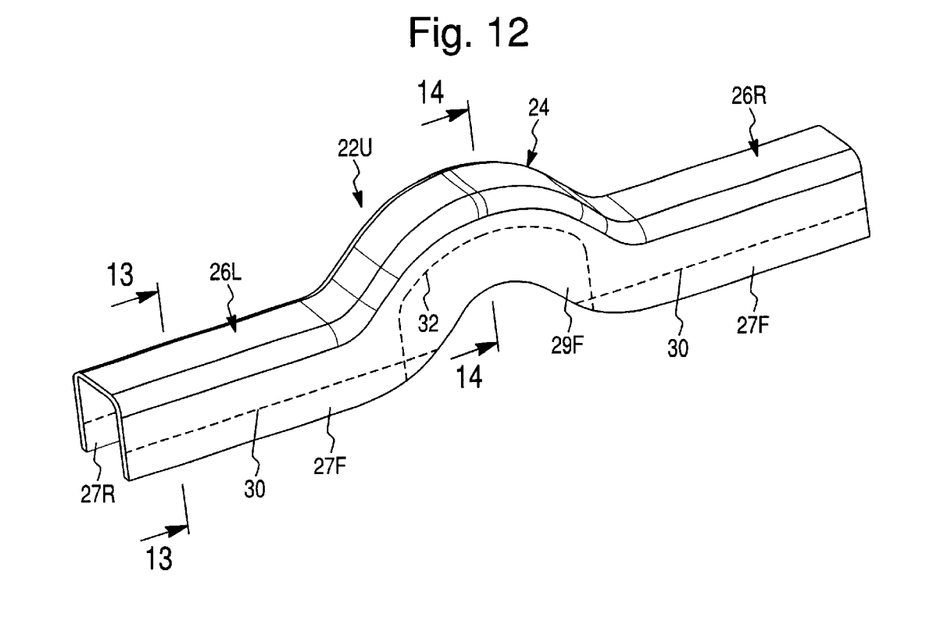
FIG. 12 is a perspective view of an upper half member of the banjo type drive axle housing after metal forming operation, but before trimming operation.

Then, if necessary, proper portions of the wall sections 27F, 27R of the axle beam half portions 26R and 26L of both the upper and lower housing half members 22U and 22L are trimmed by any appropriate means known in the art along a phantom lines 3C, as illustrated in FIG. 12, so as to provide the desired box-section of the axle beam portions 14R and 14L of the axle housing 10 that would ensure the required axle housing vertical load rating. Also, if necessary, proper portions of the front wall section 29F and the rear wall section 29R of the banjo half portion 24 of both the upper and lower housing half members 22U and 22L are trimmed by any appropriate means known in the art along a phantom lines 32, as illustrated in FIG. 12, so as to provide the desired size of the openings 16 and 18 in the central portion 12 of the axle housing 10 corresponding to a required axle housing torque rating. Thus, the upper and lower housing half members 22U and 22L that would provide the desired box-section of the axle beam portions 14R and 14L and the openings 16 and 18 in the central portion 12 of the axle housing 10 when assembled, are produced.

Finally, the trimmed matched upper and lower housing half members 22U and 22L are secured to each other, preferably by welding along mating horizontal edges.

Therefore, the present invention allows to manufacture banjo type axle housings having selective height 2Z of the box-section of the axle beam portions 14R and 14L, and selective size of the carrier opening 16 and/or the rear opening 18 of the central portion 12 determined by the specific requirements of vehicle manufacturers, using a common metal forming apparatus and, thus, a single size of the metal stamping illustrated in FIG. 12.

Referring now to FIGS. 15–18, various exemplary embodiments of the banjo type axle housings, all manufactured in accordance with the present invention using the common metal forming apparatus.

Figure 15:
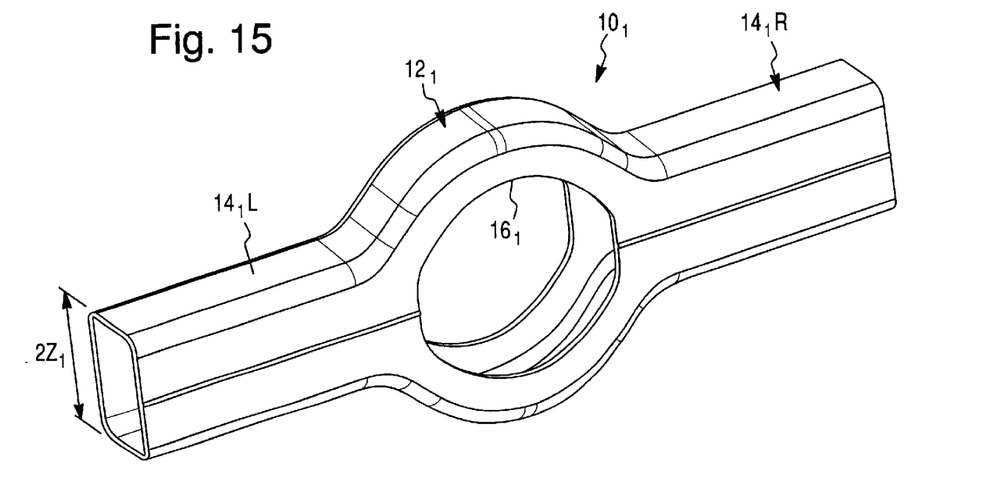
FIG. 15 is a perspective view of a first exemplary embodiment of the banjo type drive axle housing having a tall box-section and a small carrier opening.

FIG. 15 shows a first embodiment of the banjo type axle housing manufactured in accordance with the present invention, generally depicted by reference numeral $10_1$. As illustrated, the axle housing $10_1$, features axle beam portions $14_1R$ and $14_1L$ having a tall box-section having the height $2Z_1$ providing high vertical load rating, and a relatively small front carrier opening $16_1$ in a central portion $12_1$ providing a relatively low torque rating.

Figure 16:
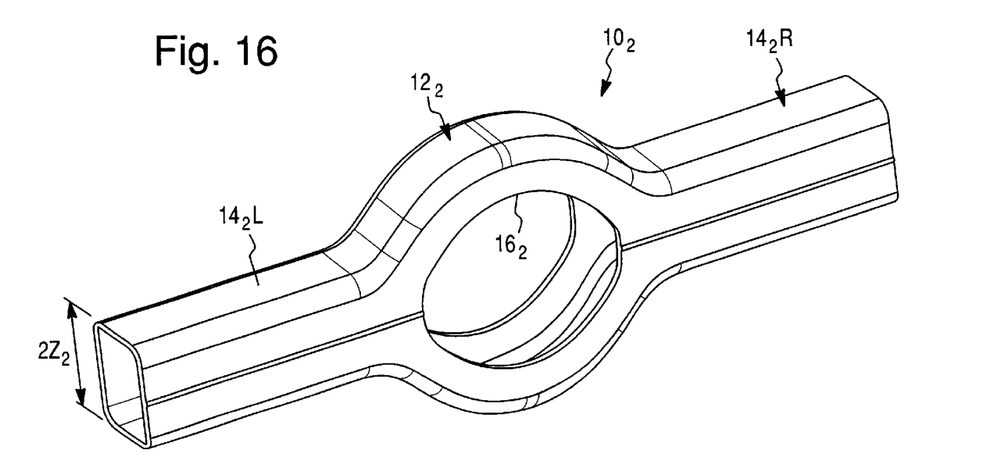
FIG. 16 is a perspective view of a second exemplary embodiment of the banjo type drive axle housing having a short box-section and a small carrier opening.

FIG. 16 shows a second embodiment of the banjo type axle housing manufactured in accordance with the present invention, generally depicted by reference numeral $10_2$. As illustrated, the axle housing $10_2$ features axle beam portions $14_2R$ and $14_2L$ having a short box-section having the height $2Z_2$ providing low vertical load rating, and a relatively small front carrier opening $16_2$ in a central portion $12_2$ providing a relatively low torque rating.

Figure 17:
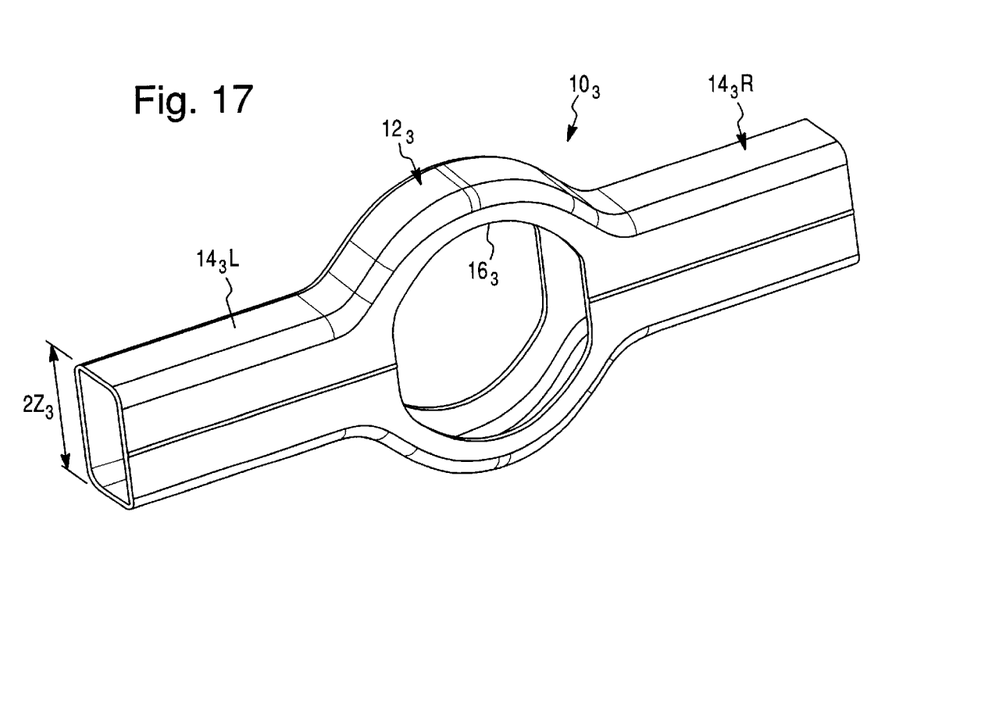
FIG. 17 is a perspective view of a third exemplary embodiment of the banjo type drive axle housing having a tall box-section and a large carrier opening.

FIG. 17 shows a third embodiment of the banjo type axle housing manufactured in accordance with the present invention, generally depicted by reference numeral $10_3$. As illustrated, the axle housing $10_3$ features axle beam portions $14_3R$ and $14_3L$ having a tall box-section having the height $2Z_3$ providing high vertical load rating, and a relatively large front carrier opening $16_3$ in a central portion $12_3$ providing a relatively high torque rating.

Figure 18:
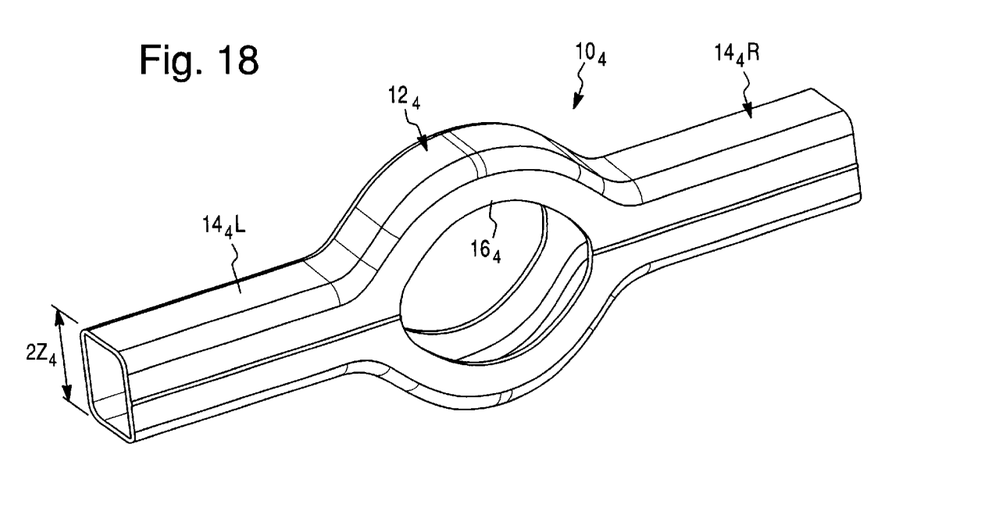
FIG. 18 is a perspective view of a forth exemplary embodiment of the banjo type drive axle housing having a short box-section and a large carrier opening.

Finally, FIG. 18 shows a forth embodiment of the banjo type axle housing manufactured in accordance with the present invention, generally depicted by reference numeral $10_4$. As illustrated, the axle housing $10_4$ features axle beam portions $14_4R$ and $14_4L$ having a short box-section having the height $2Z_4$ providing low vertical load rating, and a relatively large front carrier opening $16_4$ in a central portion $12_4$ providing a relatively high torque rating.

Thus, the improved method for manufacturing banjo type axle housings in accordance with the present invention allows to manufacture banjo type axle housings having selective height of the box-section of the axle beam portions, and selective size of the carrier opening and/or the rear opening of the central portion determined by the specific requirements of vehicle manufacturers, using a common metal forming apparatus and a single size of the metal stamping. Consequently, the method allows significantly reduce tooling expenses and provides a substantially more flexible manufacturing process.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method for manufacturing a banjo-type drive axle housing for a motor vehicle, said housing having a pair of axle beam portions axially oppositely extending from a central portion, said method including the steps of:
   (a) forming first and second elongated axle housing half members, each of said first and second housing half members having radially inwardly extending wall sections, each of said first and second housing half members including a pair of axle beam half portions axially oppositely extending from a banjo half portion;
   (b) selecting a desired box section of said beam portions of said axle housing;
   (c) selectively trimming said wall sections of said axle beam half portions of said housing half members to a degree so that more than burrs or flash material is removed so that when assembled said housing half members provide said desired box section of said beam portions of said axle housing; and
   (d) fastening said trimmed housing half members to each other to produce said axle housing.

2. The method for manufacturing a banjo-type axle housing as defined in claim 1, further comprising the steps of:
   selecting a desired size of a front opening in said central portion of said axle housing; and
   trimming said wall sections of said banjo half portion of said axle housing half members to a degree so that more than burrs or flash material is removed so that when assembled said housing half members provide said desired size of said front opening in said central portion of said axle housing,
   wherein said steps precede the step (d) of claim 1.

3. The method for manufacturing a banjo-type axle housing as defined in claim 1, wherein said step (d) is welding.

4. The method for manufacturing a banjo-type axle housing as defined in claim 1, wherein each of said housing half members having a substantially U-shaped cross-section along entire length thereof.

5. A method for manufacturing a banjo-type drive axle housing for a motor vehicle, said housing having a pair of axle beam portions axially oppositely extending from a central portion, said method including the steps of:
   (a) forming first and second elongated axle housing half members each including a banjo half portion and opposite axle beam half portions outwardly laterally extending from opposite sides of said banjo half portion, each of said housing half members having a substantially U-shaped cross-section along entire length thereof with radially extending wall sections;
   (b) selecting a desired box section of said beam portions of said axle housing;
   (c) trimming said wall sections of said axle beam half portions of said axle housing half members to a degree so that more than burrs or flash material is removed so that when assembled said housing half members provide said desired box section of said axle beam portions of said axle housing; and
   (d) fastening said trimmed housing half members to each other to produce said axle housing.

6. The method for manufacturing a banjo-type axle housing as defined in claim 5, further comprising the steps of:
   selecting a desired size of a front opening in said central portion of said axle housing; and
   trimming said wall sections of said banjo half portion of said axle housing half members to a degree so that more than burrs or flash material is removed so that when assembled said housing half members provide said desired size of said front opening in said central portion of said axle housing,
   wherein said steps precede the step (d) of claim 1.

7. A method for manufacturing a banjo-type drive axle housing for a motor vehicle, said housing having a pair of axle beam portions axially oppositely extending from a central portion, said method including the steps of:
   (a) forming first and second elongated axle housing half members each including a banjo half portion and opposite axle beam half portions outwardly laterally extending from opposite sides of said banjo half portion, each of said housing half members having a substantially U-shaped cross-section along entire length thereof with radially extending wall sections;
   (b) selecting a desired box section of said beam portions of said axle housing;
   (c) trimming said wall sections of said axle beam half portions of said axle housing half members to a degree so that more than burrs or flash material is removed so that when assembled said housing half members provide said desired box section of said axle beam portions of said axle housing;
   (d) selecting a desired size of a front opening in said central portion of said axle housing;
   (e) trimming said wall sections of said banjo half portion of said axle housing half members to a degree so that more than burrs or flash material is removed so that when assembled said housing half members provide said desired size of said front opening in said central portion of said axle housing; and
   (f) welding said trimmed housing half members to each other to produce said axle housing.

* * * * *